United States Patent [19]

Pellinen et al.

[11] Patent Number: 4,637,163
[45] Date of Patent: Jan. 20, 1987

[54] METHOD OF GROWING EDIBLE MUSHROOMS

[75] Inventors: Markku Pellinen, Otalampi; Yrjö Mälkki; Aimo Niskanen, both of Espoo, all of Finland

[73] Assignee: Valtion Teknillinen Tutkimuskeskus, Finland

[21] Appl. No.: 709,689

[22] PCT Filed: Jun. 14, 1984

[86] PCT No.: PCT/FI84/00044
§ 371 Date: Feb. 13, 1985
§ 102(e) Date: Feb. 13, 1985

[87] PCT Pub. No.: WO85/00002
PCT Pub. Date: Jan. 3, 1985

[30] Foreign Application Priority Data

Jun. 14, 1983 [FI] Finland ................................. 832135

[51] Int. Cl.$^4$ ............................................. A01G 1/04
[52] U.S. Cl. ............................................. 47/1.1; 71/5
[58] Field of Search ................................. 47/1.1; 71/5

[56] References Cited

U.S. PATENT DOCUMENTS 4,083,144 4/1978 Fuzisawa et al. .
4,127,964 12/1978 Mee ......................................... 47/1.1
4,127,965 12/1978 Mee .

FOREIGN PATENT DOCUMENTS 1632919 2/1973 Fed. Rep. of Germany .

*Primary Examiner*—Robert E. Bagwill
*Attorney, Agent, or Firm*—Andrus, Sceales, Starke & Sawall

[57] ABSTRACT

A method of producing wood-rottening edible mushrooms on a bed prepared from a carbonhydrate, lignin and protein containing compound material, said bed comprising mainly a cellulose containing material, minor amounts of proteinaceous and farinaceous substance as well as water, the bed is packed and pasteurized, a mushroom mycolim is transferred onto bed by injecting, the mycolium is grown in bed by varying the amount of temperature and light, the bed is removed from package for the production of edible mushrooms. According to the invention the bed material is mixed with minor amounts of peat during the preparation of the material, the total amount of starch and protein is restricted to less than 10% and the pH value of bed is adjusted to less than 5.

7 Claims, No Drawings

METHOD OF GROWING EDIBLE MUSHROOMS

The present invention relates to the production of edible mushrooms in commercial or household scale by making use of solid nutrition beds that are made of low-priced cellulose and lignin containing materials. A particular object of the invention is the production of wood-rotting edible mushrooms, such as *Lentinus edodes* species.

Growing of wood-rotting mushrooms has traditionally been effected in blocks chopped off the trunks of oak or oak-related or other hardwood species. Growing is usually done outdoors and for climatic reasons the production of e.g. *Lentinus edodes* has only been possible in such subtropical countries where the relative humidity of air is sufficiently high for growing. This mode of growing is also quite labor intensive.

In order to compensate for growing in blocks of wood, efforts have been made also toward developing compound nutrition beds and growing technique applicable to the use thereof. One such method has been described in U.S. Pat. No. 4,127,965. In this method, the raw material comprises substantially sawdust obtained from hardwood species, the share of hardwood being necessarily at least 60%, and farinaceous and proteinaceous waste materials, the amount of starch having been 5-15% and the amount of protein 1-15% of the entire nutrition bed. As for its reaction, the growth bed is neutral or slightly acidic (pH 4,5-7) and, thus, the competitivity of mycelium and the prevention of contaminations require sterilization of the nutrition bed followed by aseptic treatment thereof. The most serious drawbacks of prior art methods are manual processes and high contamination percentage resulting therefrom. The performance of various steps of growing is quite labor intensive, requiring e.g. designing of nutrition beds in the growing step of mycelium and/or the use of special moulds, which further add to the growing costs.

The present invention strives to eliminate drawbacks of the prior art methods by developing the growing technique of wood-rotting mushrooms, such as *Lentinus edodes, Kuehneromyces mutabilis,* Pholiota spp. and Pleurotus spp. in solid compound materials, while also striving to decrease raw material costs and to simplify the process as well as to clear up possibilities of mechanizing it, the objective being however to maintain the sensory properties of mushrooms and satisfactory level of crop.

When looking for economically available raw materials it was found out that the mycelium of *Lentinus edodes* grows well also in northern Europe on beds containing the sawdust of general hardwood species, such s alder, (*Alnus incana, A. glutinosa*), birch, (*Betula pubescens, B. pendula*) and aspen, (*Populus tremula*), the sawdust of alder and birch being clearly superior to that of aspen. In order to increase the nutritive content of a nutrition bed use is made of a material containing some farinaceous and proteinaceous substance, preferably e.g. threshing and assorting wastes of grain. By limiting the amount of readily hydrolyzable polysaccharides, such as starch, and mono- as well as oligosaccharides and added proteins used for the growth bed to less than 10% of the nutrition bed material as well as by extending the growing time of mycelium it has been possible to increase the ability of mycelium to exploit the polysaccharides and lignin of wood and at the same time to substantially increase productivity of the culture as compared to the prior art methods.

In the method of the invention, minor amounts of peat are mixed with the bed material during preparation. The peat balances water content of the bed and solidifies the bed, thus eliminating the necessity of using moulds in this method. In addition, the peat decreases pH value of the bed. The amount of peat preferably exceeds 4%.

In order to simplify the prevention of contaminations and to decrease the investment and operating costs of the equipment needed therefor, it proved preferabe to adjust the pH value of a bed to less than 5, whereby a sufficient effect will be achieved by means of a pasteurization treatment effected to the internal temperature of not more than 100° C. In a preferred application, the pH value is adjusted to less than pH 4,5, whereby it may be possible to further lower the temperature of said pasteurization treatment. This also cuts down the heat resistance requirements to set for a compound bed packaging material and it is possible to use as a package an oxygen permeable sufficiently thin plastic film and it shall not be necessary to employ special air intake ports for ensuring oxygen inlet and, thus, protection of such ports against bacterial and mildew contamination is eliminated. Packing in such a package is also readily mechanizable likewise heating to temperatures close to 100° C. can be readily made continuous e.g. by means of an extruder, and such heating can also be combined with packing step.

Following the pasteurization, the method of the invention comprises growing of mycelium preferably at the temperature of circa 20°-30° C. in the dark for several weeks, preferably for circa 10-14 weeks, during which time the packages are opened and the beds kept at the temperature of circa 10°-15° C. in the light for several days, preferably for circa 10-18 days time. Thereafter, the beds are removed out of the packages and kept at the temperature of 15°-20° C., with relative humidity 85-95%, for several weeks, preferably for 10-20 weeks. During this storage period, the beds are submerged several times in water for several hours for inducing the formation of spore cases.

The growth of mycelium, inducement of the formation of spore cases and the production of spore cases take place in the conditions according to the temperature and moisture requirements of each mushroom species and strain. The durations of various growing steps are mainly determined according to a mushroom species and strain, temperatures, a nutrition bed composition and oxygen supply.

The following examples illustrate growing according to the invention:

EXAMPLE 1

| Growth bed: | | |
|---|---|---|
| | birch sawdust, air-dry | 75% |
| | wheat threshing and drying waste, with grains appr. 20% | 20% |
| | peat | 5% |

Water content of bed is adjusted to 60-70% and it is packed mechanically or manually in a polyethene sleeve of HD (high density) quality, whose thickness is 0.02-0.04 mm and diameter 6-15 cm, into 20-40 cm long pieces. The sleeve ends are sealed by means of a wire clamp and growth bed are pasteurized by heating so as to increase the internal temperature of bed to at least 80, preferably to 100° C. After pasteurization, the pH value of bed is 4–5 depending on the composition of waste, the total nitrogen content of bed is 1.1–1.3% and ammonium nitrogen content 0.2–0.3% on the basis of dry weight.

After cooling, said growth beds are inoculated by injecting therein through packaging film a homogenized mycelium of *Lentinus edodes* mushroom, either in its growing bed or suspended in water or an aqueous solution. The amount of inoculum is appr. 0.5% of the bed weight. The injection holes are sealed with adhesive tape or other suitable means.

The mycelium is grown at the temperature of 25° C. in the dark for about 3 months time. During this period, the sleeve ends are opened and beds are kept in a light room at 10°–15° C. temperature for 2 weeks time. The packaging sleeves are removed from growth beds. At this time, the beds have reached a proper shape and sufficient firmness without shaping or mould treatment. The production of fruiting bodies takes place at 18° C. temperature and at appr. 90% relative humidity and takes 3–4 months, during this period the beds are submerged about 5 times for 24 hours in cold (appr. 10° C.) water for inducing the formation of fruiting bodies. The growing room is illuminated with regular fluorescent tubes for 8 hours a day during the production stage of mushrooms. Mushroom yield is about 1 kg of fresh mushroom per 1 kg of nutrition bed dry matter.

EXAMPLE 2

Growing of *Lentinus edodes* mushroom as set out in example 1 by combining mixing, heating and packing of a nutrition bed into a single operation by using an extruder and a packaging device connected thereto.

EXAMPLE 3

Growing of *Kuehneromyces mutabilis* and Pholiota spp. mushrooms

| Growth bed: | birch sawdust (air-dry) | 60% |
| --- | --- | --- |
| | wheat threshing waste (air-dry) | 30% |
| | peat (air-dry) | 10% |

Growing as set out in example 1.

The above specification of the invention and the attached work examples only describe some of the applications of the invention. The method of the invention can vary in a plurality of ways within the scope of the annexed claims.

We claim:

1. A method of producing wood-rotting edible mushrooms *Lentinus edodes, Kuehneromyces mutabilis*, Pholiota spp. and Pleurotus spp. utilizing a bed material mixed from a carbohydrate, lignin and protein containing compound material and minor amount of peat, said bed comprising mainly a cellulose containing material, minor amounts of proteinaceous and farinaceous substance as well as water, said method comprising adjusting the bed material to pH value below 5 prior to heating, packing the bed material into packages and heating the packages to an internal temperature of at least 80 and not higher than 100° C., firming the substrate bed without the use of a form; transferring a mushroom mycelium onto the bed; growing the mycelium in the bed at a temperature suitable for the species and strain; and removing the bed from the package for the production of edible mushrooms.

2. A method as set forth in claim 1 further comprising the steps of removing the bed from the package and submerging the bed in water at a temperature lower than the incubation temperature for several hours.

3. A method as set forth in claim 1 wherein the amount of peat in the bed exceeds 4% of the substrate materials without water.

4. A method as set forth in claim 1 wherein the bed is packed in plastic film sufficiently permeable to air to allow mycelium growth without separate filtered venting devices.

5. A method as set forth in claim 1 wherein the pH value of the bed is adjusted to less than 4.5.

6. A method as set forth in claim 1 further comprising the step of limiting the amount of readily hydrolyzable polysaccharides, as well as monosaccharides and oligosaccharides and added proteins in the growth bed to less than 10%.

7. A method as set forth in claim 1 wherein the mushroom mycelium is transferred to the bed by injecting homogenized liquid mycelium into the bed material which has been packed in thin, air-permeable plastics, and after pasteurization and cooling the substrate.

* * * * *